United States Patent
Miyata et al.

(10) Patent No.: US 12,490,659 B2
(45) Date of Patent: Dec. 2, 2025

(54) OSCILLATOR AND QUANTUM COMPUTER

(71) Applicant: NEC Corporation, Tokyo (JP)

(72) Inventors: Akira Miyata, Tokyo (JP); Katsumi Kikuchi, Tokyo (JP); Suguru Watanabe, Tokyo (JP); Takanori Nishi, Tokyo (JP); Hideyuki Satou, Tokyo (JP); Tomohiro Yamaji, Tokyo (JP); Tsuyoshi Yamamoto, Tokyo (JP); Yoshihito Hashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 437 days.

(21) Appl. No.: 18/007,765

(22) PCT Filed: Jun. 5, 2020

(86) PCT No.: PCT/JP2020/022445
§ 371 (c)(1),
(2) Date: Dec. 2, 2022

(87) PCT Pub. No.: WO2021/245951
PCT Pub. Date: Dec. 9, 2021

(65) Prior Publication Data
US 2023/0276717 A1     Aug. 31, 2023

(51) Int. Cl.
*H10N 69/00*     (2023.01)
*G06N 10/40*     (2022.01)

(52) U.S. Cl.
CPC ............. *H10N 69/00* (2023.02); *G06N 10/40* (2022.01)

(58) Field of Classification Search
CPC ............................... G06N 10/40; H10N 69/00
See application file for complete search history.

(56) References Cited

U.S. PATENT DOCUMENTS

| | | | |
|---|---|---|---|
| 2017/0186934 A1* | 6/2017 | Kwon | ................ G06N 10/40 |
| 2018/0358539 A1 | 12/2018 | Goto | |
| 2020/0050961 A1 | 2/2020 | Abdo | |
| 2020/0091867 A1 | 3/2020 | Goto et al. | |

FOREIGN PATENT DOCUMENTS

| | | |
|---|---|---|
| JP | H05-160453 A | 6/1993 |
| JP | H09-145811 A | 6/1997 |
| JP | 2019-003975 A | 1/2019 |
| JP | 2019-036625 A | 3/2019 |
| JP | 2020-047999 A | 3/2020 |

OTHER PUBLICATIONS

International Search Report for PCT Application No. PCT/JP2020/022445, mailed on Sep. 8, 2020.
JP Office Action for JP Application No. 2022-528406, mailed on Jan. 23, 2024 with English Translation.

* cited by examiner

*Primary Examiner* — Matthew L Reames
(74) *Attorney, Agent, or Firm* — Sughrue Mion, PLLC

(57) ABSTRACT

Provided are an oscillator and a quantum computer capable of suppressing an occupied area of a circuit. An oscillator (300) includes a resonator (100) including a plurality of loop circuits in which a first superconducting line (112a), a first Josephson junction (111a), a second superconducting line (112b), and a second Josephson junction (111b) are annularly connected, and a magnetic field application circuit (200) including an electrode that goes around in a predetermined shape and configured to apply a magnetic field to the loop circuit, in which the electrode is arranged so as to face at least two of the loop circuits.

6 Claims, 14 Drawing Sheets

OSCILLATOR AND QUANTUM COMPUTER

This application is a National Stage Entry of PCT/JP2020/022445 filed on Jun. 5, 2020, the contents of all of which are incorporated herein by reference, in their entirety.

TECHNICAL FIELD

The present disclosure relates to an oscillator and a quantum computer, and more particularly, to an oscillator and a quantum computer using a superconductor.

BACKGROUND ART

A circuit using a superconductor has been studied. For example, Patent Literature 1 discloses a resonator including a plurality of superconducting quantum interference devices (SQUIDs) connected in series and a capacitor. In addition, Patent Literature 2 discloses a mounting structure of a magnetic field application circuit for oscillating a resonator. In this mounting structure, the magnetic field application circuit is formed on the same plane as the resonator.

CITATION LIST

Patent Literature

Patent Literature 1: United States Patent Application, Publication No. 2020/0050961

Patent Literature 2: Japanese Unexamined Patent Application Publication No. 2020-047999

SUMMARY OF INVENTION

Technical Problem

By using a plurality of SQUIDs as in the configuration described in Patent Literature 1, a degree of freedom in designing parameters of a resonator can be improved. However, since a wire of a magnetic field application circuit for applying a magnetic field to the plurality of SQUIDs becomes longer according to the number of SQUIDs, in a case where the magnetic field application circuit is mounted as in Patent Literature 2, an occupied area of the circuit increases.

The present disclosure has been made to solve such a problem, and an object of the present disclosure is to provide an oscillator and a quantum computer capable of suppressing an occupied area of a circuit.

Solution to Problem

According to a first aspect of the present disclosure, there is provided an oscillator including: a resonator including a plurality of loop circuits in which a first superconducting line, a first Josephson junction, a second superconducting line, and a second Josephson junction are annularly connected; and a magnetic field application circuit including an electrode that goes around in a predetermined shape, the magnetic field application circuit being configured to apply a magnetic field to the loop circuit, in which the electrode is arranged to face at least two of the loop circuits.

Advantageous Effects of Invention

According to the present disclosure, it is possible to provide an oscillator and a quantum computer capable of suppressing an occupied area of a circuit.

EXAMPLE EMBODIMENT

For clarity of description, in the following description and figures, omission and simplification are made as appropriate. In the figures, the same or corresponding elements are denoted by the same reference signs, and an overlapping description is omitted as necessary for clarity of description.

First Example Embodiment

Figure 1:
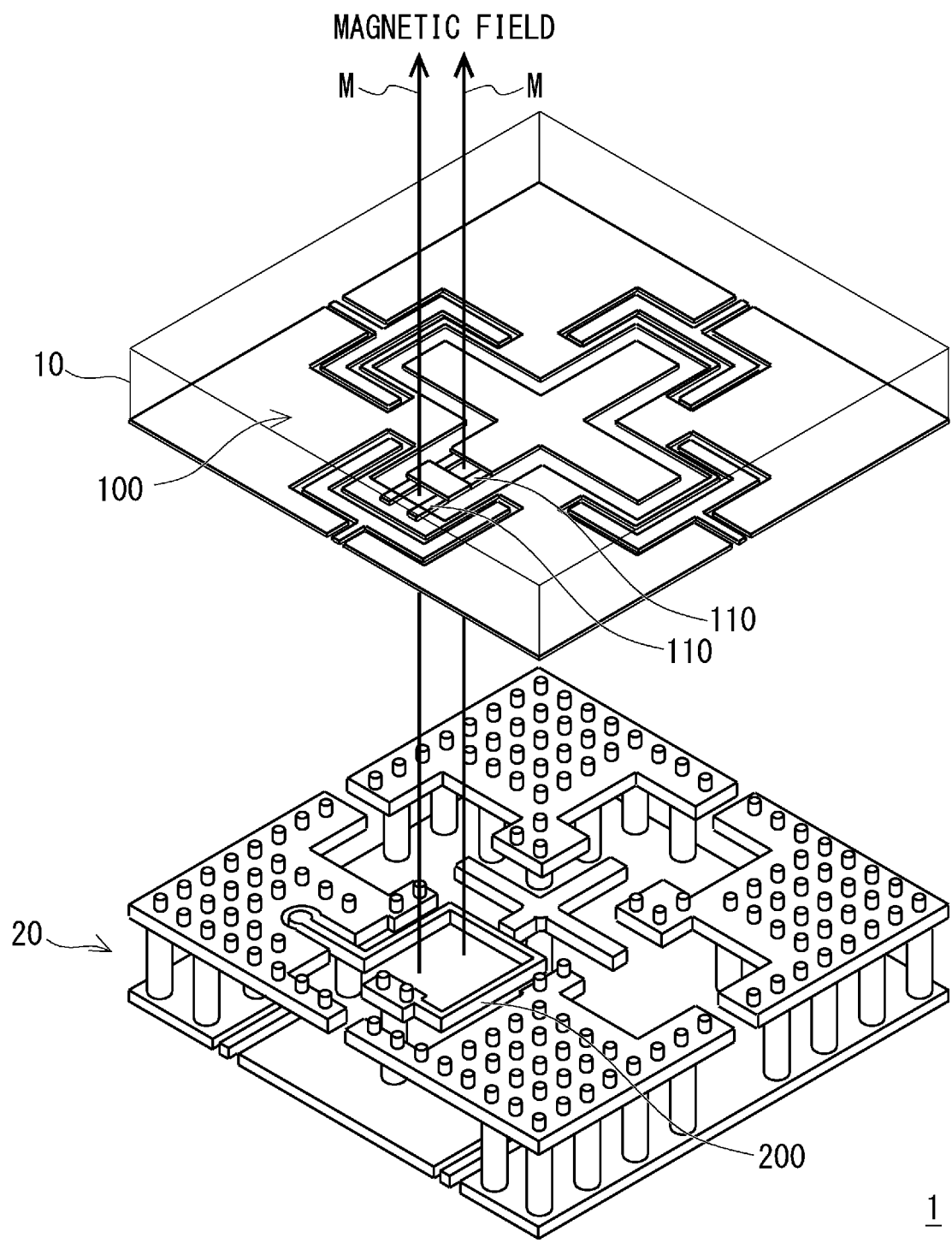
FIG. 1 is a perspective view schematically illustrating an example of a mounting structure of a quantum device according to a first example embodiment.
Figure 2:
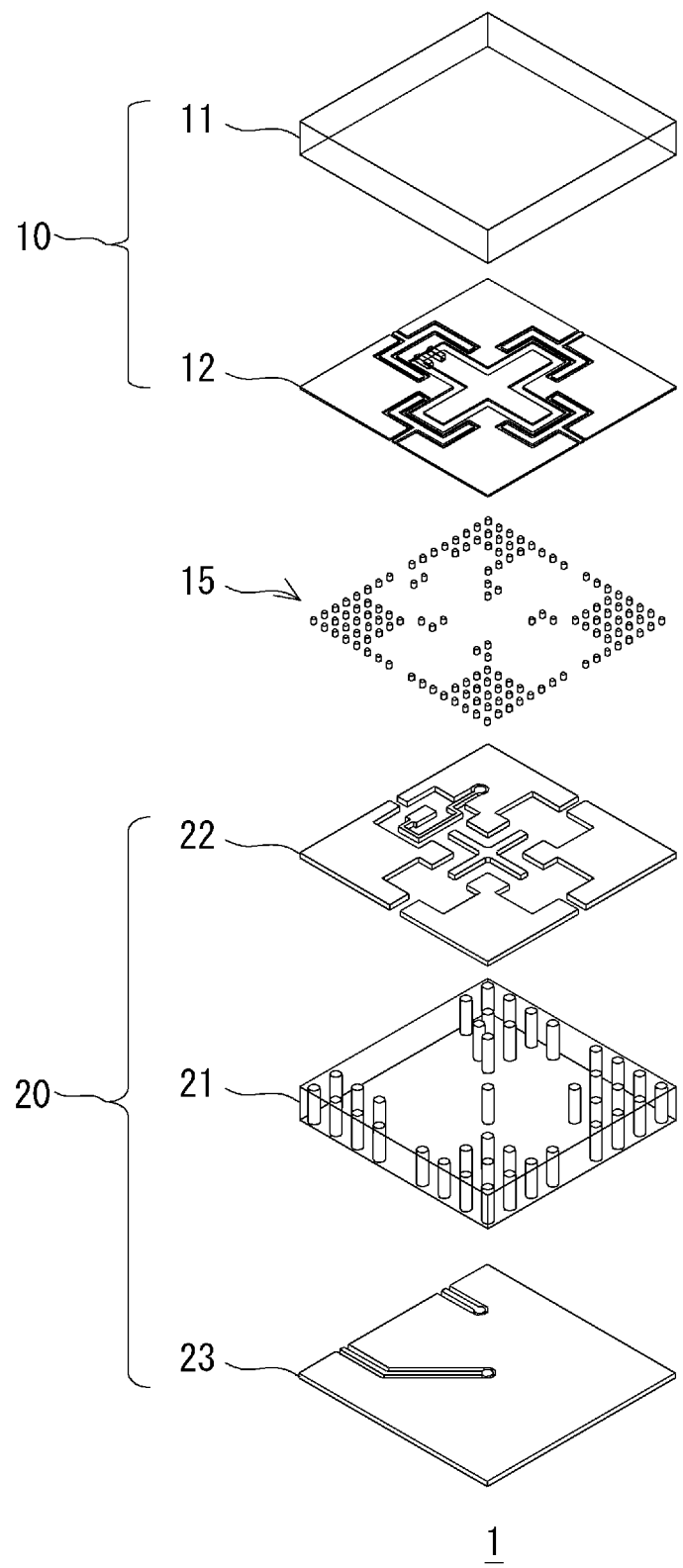
FIG. 2 is an exploded view of the quantum device according to the first example embodiment.
Figure 3:
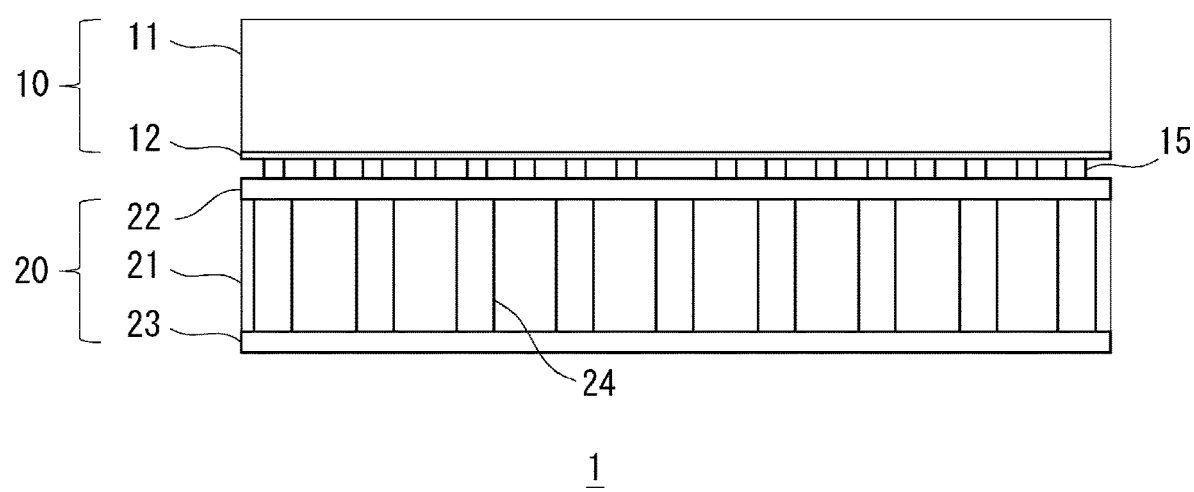
FIG. 3 is a schematic diagram illustrating an actual mounting structure of the quantum device according to the first example embodiment.

FIG. 1 is a perspective view schematically illustrating an example of a mounting structure of a quantum device 1 according to an example embodiment. In FIG. 1, a quantum chip 10 and an interposer 20 are illustrated apart from each other for easy understanding. FIG. 2 is an exploded view of the quantum device 1. In addition, FIG. 3 is a schematic diagram illustrating an actual mounting structure of the quantum device 1. As illustrated in FIGS. 2 and 3, the quantum device 1 includes the quantum chip 10 configured using a first substrate 11 and the interposer 20 configured using a second substrate 21. The quantum chip 10 is mounted on the interposer 20 by flip-chip connection via bumps 15. That is, the quantum chip 10 is flip-chip mounted on the interposer 20 for connection with an external circuit or the like. A space between the quantum chip 10 and the interposer 20 is, for example, vacuum.

As illustrated in FIGS. 2 and 3, a superconducting wiring layer 12 is provided on a surface of the first substrate 11 connected to the bumps 15, that is, a surface facing the second substrate 21. In the superconducting wiring layer 12, circuits of a resonator 100 and a coupler 104 to be described below are formed. A superconducting wiring layer 22 is provided on a surface (referred to as a front surface) of the second substrate 21 connected to the bumps 15, that is, a surface facing the first substrate 11. In the superconducting wiring layer 22, circuits of a magnetic field application circuit 200 and a reading unit 210 to be described below are formed. A superconducting wiring layer 23 is provided on a surface (referred to as a back surface) of the second substrate 21 opposite to the above-described front surface. In the superconducting wiring layer 23, wires connected to the superconducting wiring layer 22 on the front surface via vias 24 provided in the second substrate 21 are formed. For example, wires for connecting the magnetic field application circuit 200 and the reading unit 210 to an external circuit are formed in the superconducting wiring layer 23. As described above, the quantum chip 10 (first substrate 11) and the interposer 20 (second substrate 21) are stacked, and in particular, the surface on which the resonator 100 is formed and the surface on which the magnetic field application circuit 200 is formed are stacked.

Here, for example, a silicon substrate is used for the first substrate 11 and the second substrate 21, but the material of the substrate is not limited thereto. For example, a sapphire substrate or a glass substrate may be used. In addition, in the present example embodiment, the superconducting wiring layers 12, 22, and 23, the bumps 15, and the vias 24 are realized by a superconductor. Examples of a material of the superconductor include niobium, niobium nitride, aluminum, indium, lead, tin, rhenium, palladium, titanium, titanium nitride, tantalum, and an alloy containing any of these. Note that all of the superconducting wiring layers 12, 22, and 23, the bumps 15, and the vias 24 may not necessarily be realized by a superconductor, and a normal conductor may be used for at least a part except for the superconducting wiring layer 12. Examples of a material of the normal conductor include copper, silver, gold, platinum, and an alloy containing any of these. In order to realize the superconducting state, the quantum device 1 is used in a temperature environment of, for example, about 10 mK (milli-Kelvin) realized by a refrigerator.

Figure 4A:
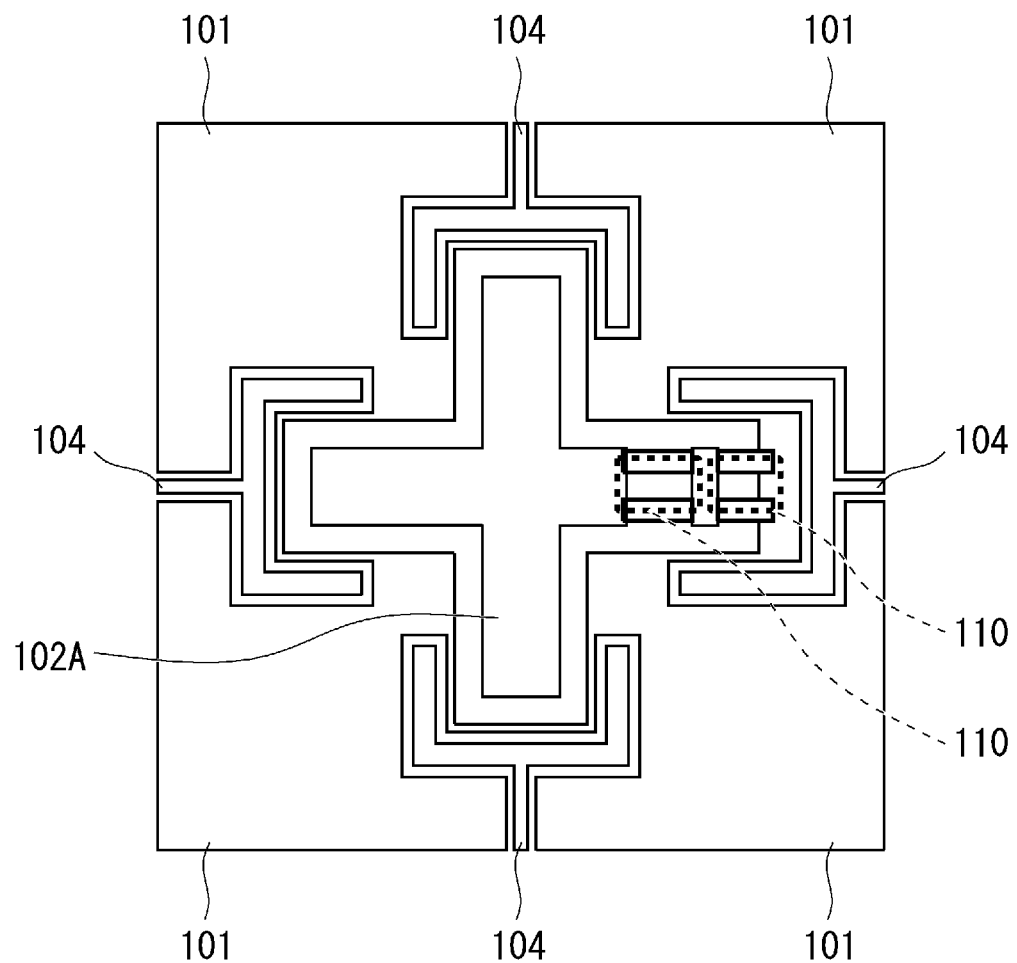
FIG. 4A is a plan view of a superconducting wiring layer on a lower surface of the quantum chip according to the first example embodiment.
Figure 4B:
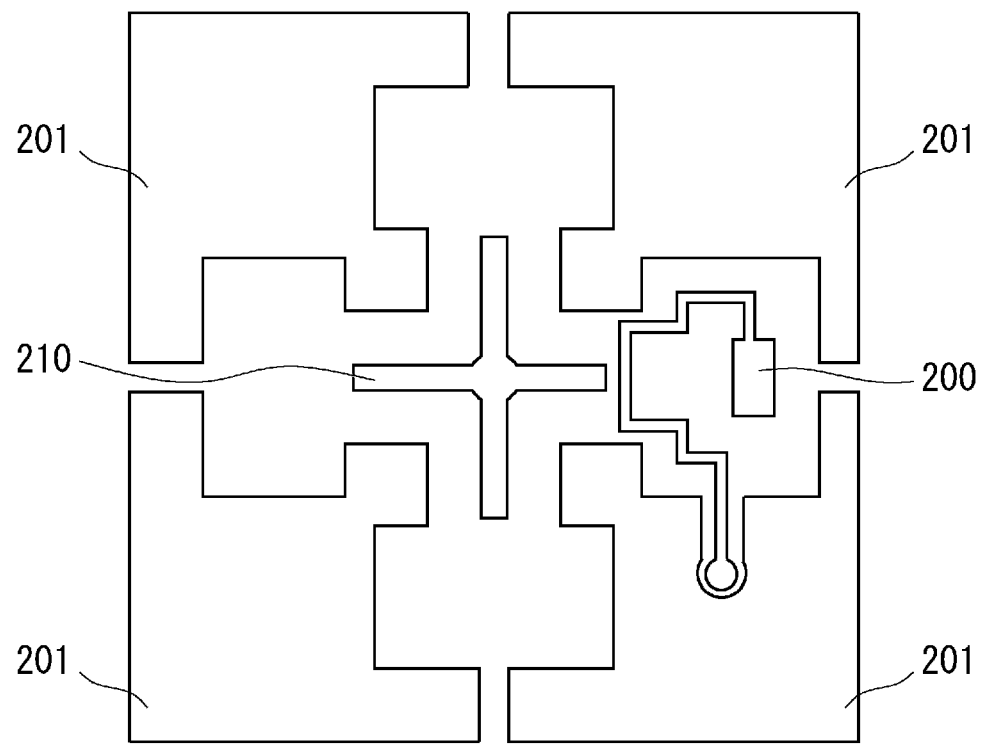
FIG. 4B is a plan view of the superconducting wiring layer on an upper surface of an interposer according to the first example embodiment.

The configuration of the quantum device 1 illustrated in FIG. 1 will be specifically described with reference to other figures. FIG. 4A is a plan view of the superconducting wiring layer 12, and FIG. 4B is a plan view of the superconducting wiring layer 22. More specifically, FIGS. 4A and 4B are plan views of the superconducting wiring layer 12 and the superconducting wiring layer 22 when viewed from a direction (vertical direction in FIG. 1) in which a surface of the superconducting wiring layer 12 and a surface of the superconducting wiring layer 22 face each other.

Figure 5:
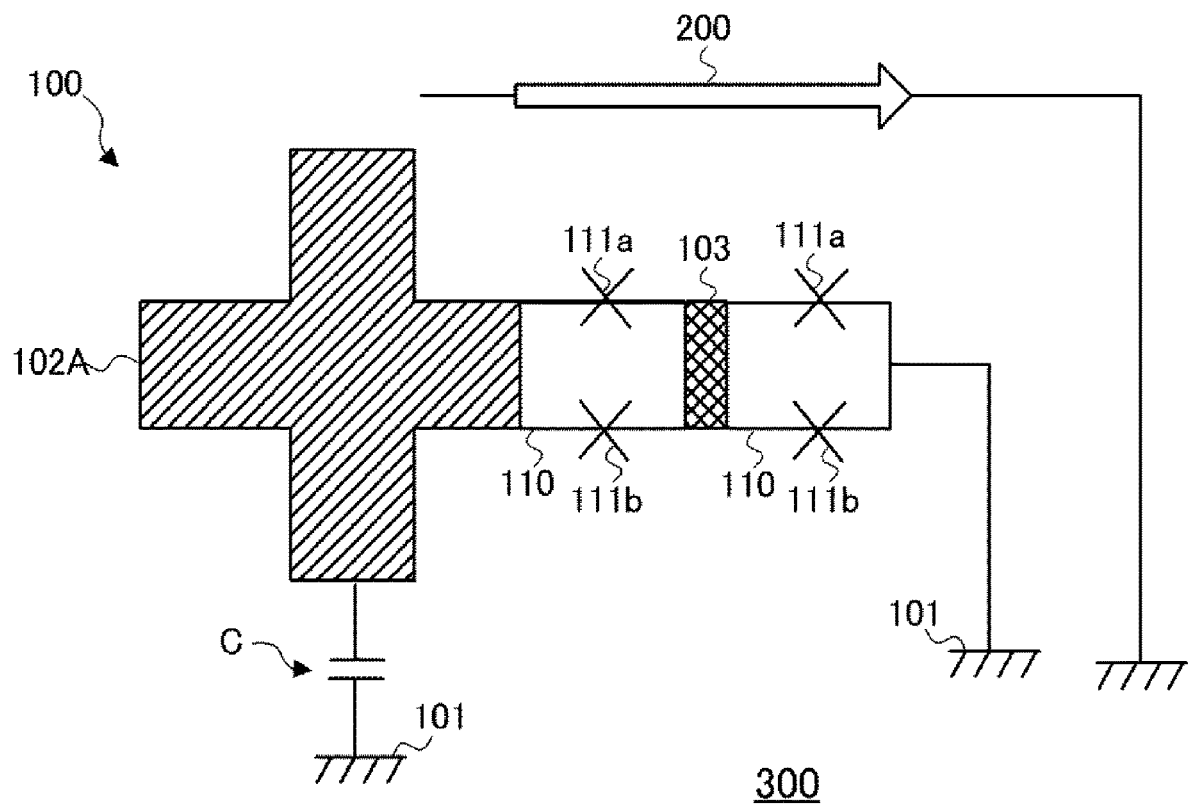
FIG. 5 is a schematic diagram illustrating a circuit configuration of an oscillator according to the first example embodiment.
Figure 6:
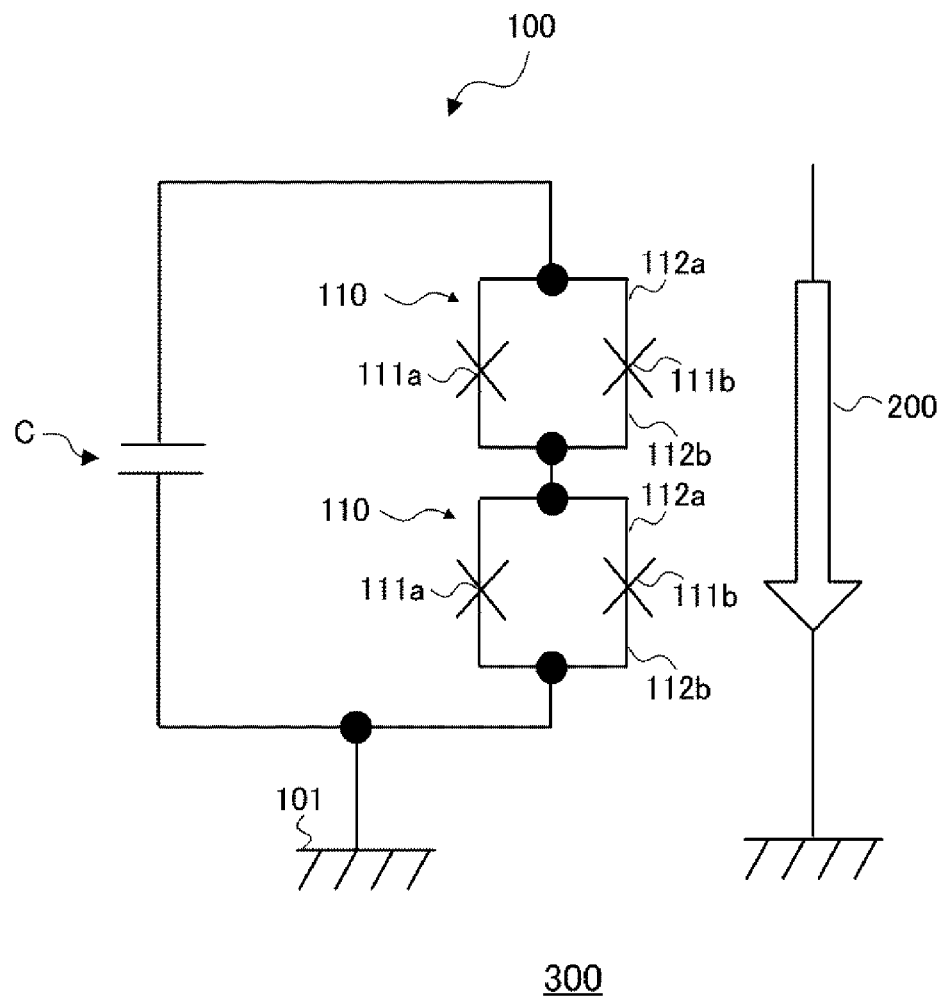
FIG. 6 is a schematic diagram illustrating an equivalent circuit of the circuit illustrated in FIG. 5.

As described above, the coupler 104 and the resonator 100 illustrated in FIGS. 5 and 6 to be described below are formed in the superconducting wiring layer 12. More specifically, the superconducting wiring layer 12 includes a conductive member 102A, a plurality of SQUIDs 110, a ground electrode 101, and a coupler 104. In the present example embodiment, four couplers 104 are arranged on four sides of the conductive member 102A, but the number of couplers 104 is not limited to four. In the present example embodiment, the conductive member 102A has a cross shape. The ground electrode 101 is arranged around the conductive member 102A so as to surround the conductive member 102A. The conductive member 102A and the ground electrode 101 are separated from each other, and there is a gap therebetween. Thus, the conductive member 102A and the ground electrode 101 are capacitively coupled. In other words, a capacitor C (see FIGS. 5 and 6) is formed between the conductive member 102A and the ground electrode 101.

A plurality of SQUIDs 110 is connected in series to the conductive member 102A. Although two SQUIDs 110 are connected in series in the present example embodiment, three or more SQUIDs may be connected. Specifically, as illustrated in FIG. 4A, a plurality of SQUIDs 110 is connected to one of four end portions (that is, tips of the four arms of the cross-shaped conductive member 102A) that are portions protruding outward in the cross-shaped conductive member 102A so as to bridge between the conductive member 102A and the ground electrode 101. That is, one end of the series of SQUIDs 110 is connected to the conductive member 102A, and the other end is connected to the ground electrode 101. In other words, the plurality of SQUIDs 110 connected in series is arranged between the conductive member 102A and the ground electrode 101. In the present example embodiment, among the four arms of the cross-shaped conductive member 102A, the arm connected to the series of SQUIDs 110 is shorter than the other three arms according to the length of the series of SQUIDs 110.

The conductive member 102A and the SQUIDs 110 constitute the resonator 100. In the present example embodiment, the ground electrode 101 is used to form a closed circuit including the conductive member 102A and the SQUIDs 110. In addition, the resonator 100 and the magnetic field application circuit 200 provided in the superconducting wiring layer 22 constitute an oscillator 300. Hereinafter, the oscillator 300 will be described with reference to FIGS. 5 and 6.

One end of the series of SQUIDs 110 is connected to the conductive member 102A that is capacitively coupled to the ground electrode 101, and the other end is connected to the ground electrode 101. Therefore, the resonator 100 in the quantum device 1 is represented by a circuit diagram as illustrated in FIG. 5. That is, as illustrated in an equivalent circuit illustrated in FIG. 6, the resonator 100 is a circuit having the following configuration. The resonator 100 includes the SQUIDs 110 and the capacitor C. The series of SQUIDs 110 are shunted by the capacitor C.

Each of the SQUIDs 110 is a circuit in which two Josephson junctions (first Josephson junction 111a and second Josephson junction 111b) are annularly connected by the superconducting lines. That is, the SQUID 110 is an annular loop circuit having the first Josephson junction 111a and the second Josephson junction 111b. Here, the Josephson junction refers to an element having a structure in which a thin insulating film is sandwiched between two superconductors. More specifically, as illustrated in FIG. 6, the SQUID 110 has the following configuration. The SQUID 110 includes a first superconducting line 112a connecting the first Josephson junction 111a and the second Josephson junction 111b, and a second superconducting line 112b connecting the first Josephson junction 111a and the second Josephson junction 111b. In other words, the resonator 100 includes the SQUID 110 that is a loop circuit in which the first superconducting line 112a and the second superconducting line 112b are joined by the first Josephson junction 111a and the second Josephson junction 111b. As illustrated in FIG. 6, the first superconducting line 112a, the first Josephson junction 111a, the second superconducting line 112b, and the second Josephson junction 111b are annularly connected to form a loop circuit (that is, the SQUID 110). In other words, in the SQUID 110, the first superconducting line 112a and the second superconducting line 112b are joined by the first Josephson junction 111a and the second Josephson junction 111b to form a loop.

Each of the SQUIDs 110 may use a conductive member 102A, an intermediate wire 103, or a ground electrode 101 in order to connect the two Josephson junctions (a first Josephson junction 111a and a second Josephson junction 111b) constituting the SQUID 110 in a loop shape. Here, as illustrated in FIG. 5, the intermediate wire 103 is a conductive member for connecting the adjacent SQUIDs 110 in series. In the example illustrated in FIG. 5, in the SQUID 110 on the left side, a loop circuit is configured by the conductive member 102A, the first Josephson junction 111a, the intermediate wire 103, and the second Josephson junction 111b. Similarly, in the SQUID 110 on the right side, a loop circuit is configured by the intermediate wire 103, the first Josephson junction 111a, the ground electrode 101, and the second Josephson junction 111b. In this way, the first superconducting line 112a and the second superconducting line 112b described above are configured using, for example, the conductive member 102A, the intermediate wire 103, or the ground electrode 101.

The magnetic field application circuit 200 and the resonator 100 are magnetically coupled via mutual inductance. In other words, the magnetic field application circuit 200 and the resonator 100 are inductively coupled. The magnetic field application circuit 200 is a circuit that generates an AC magnetic field and applies the AC magnetic field to the plurality of SQUIDs 110. The magnetic field application circuit 200 is a circuit through which an alternating current flows, and generates an alternating magnetic field by the alternating current. More specifically, a current in which a direct current and an alternating current are superimposed flows through the magnetic field application circuit 200. A frequency of the generated alternating magnetic field is equal to a frequency of this alternating current. Magnitudes of a magnetic flux and an oscillation frequency (resonance frequency) are controlled by a magnitude of the direct current. The resonance frequency of the resonator 100, that is, the oscillation frequency of the oscillator 300 depends on the equivalent inductance of the SQUID 110. The equivalent inductance depends on the magnitude of the magnetic flux passing through the loop of the SQUID 110. The magnitude of the magnetic flux passing through the loop depends on the magnitude of the direct current flowing through the magnetic field application circuit 200. Therefore, as described above, the magnitude of the oscillation frequency (resonance frequency) is controlled by the magnitude of the direct current.

When an alternating current magnetic field of 2 times the resonance frequency of the resonator 100 is applied to the SQUID 110 by applying an alternating current to the magnetic field application circuit 200, the oscillator 300 oscillates at the resonance frequency (that is, an oscillation frequency of 0.5 times the frequency of the alternating current magnetic field). This oscillation is called parametric oscillation. Thus, the oscillator 300 is also referred to as a Josephson parametric oscillator. The oscillation state can take either a first oscillation state or a second oscillation state in which phases are different from each other by $\pi$. The first oscillation state and the second oscillation state correspond to 0 and 1 of the quantum bits. That is, the oscillator 300 (resonator 100) can be used as a quantum bit circuit.

Referring again to FIG. 4A, the description of the superconducting wiring layer 12 will be continued. The coupler 104 is arranged around the conductive member 102A. The coupler 104 is a circuit for coupling with another resonator having a configuration similar to that of the resonator 100. The coupler 104 is capacitively coupled to the resonator 100. In the present example embodiment, specifically, as illustrated in FIG. 4A, the coupler 104 is arranged at each of four end portions (that is, the tips of the four arms of the cross-shaped conductive member 102A), which are portions protruding outward in the cross-shaped conductive member 102A. Each coupler 104 is arranged close to the end portion of the conductive member 102A so as to surround the end portion. The coupler 104 and the conductive member 102A are separated from each other, and the ground electrode 101 exists therebetween. The coupler 104 extends to the side opposite to the conductive member 102A, and the ground electrodes 101 are arranged on both sides of the extended portion at intervals from the coupler 104. As illustrated in FIG. 4A, the ground electrode 101 has a shape in which a region where the conductive member 102A, the SQUID 110, and the coupler 104 are arranged is cut out. That is, the ground electrode 101 is formed so as to cover the peripheries of the conductive member 102A, the SQUID 110, and the coupler 104.

Next, the superconducting wiring layer 22 will be described with reference to FIG. 4B. In the superconducting wiring layer 22, the magnetic field application circuit 200, the reading unit 210, and a ground electrode 201 are formed.

The ground electrode 201 has a shape in which a region corresponding to the conductive member 102A, the SQUID 110, and the coupler 104 is cut out in order to reduce the influence of the proximity of the ground electrode 201 of the superconducting wiring layer 22 to the resonator 100 and the coupler 104. Examples of the above influence include an influence on a resonance frequency and a quality factor of the resonator 100, a coupling degree of the coupler 104, a characteristic impedance of the coplanar line of the coupler 104, and the like. The ground electrode 201 is connected to the ground electrode 101 via the bumps 15. In the superconducting wiring layer 22, the reading unit 210 and the magnetic field application circuit 200 are arranged in a region where the ground electrode 201 does not exist.

The reading unit 210 is a circuit capacitively coupled to the resonator 100, and is an electrode for reading an internal state of the resonator 100 (oscillator 300), that is, an oscillation state. The reading unit 210 is connected to the superconducting wiring layer 23, and is connected to an external circuit that acquires the internal state of the resonator 100 (oscillator 300) via the superconducting wiring layer 23. The shape of the reading unit 210 is, for example, a shape corresponding to the shape of the conductive member 102A of the superconducting wiring layer 12, and in the present example embodiment, the shape of the reading unit 210 is a cross shape. The reading unit 210 is arranged at a position overlapping with the conductive member 102A when viewed from a direction (vertical direction in FIG. 1) in which a surface of the superconducting wiring layer 12 and a surface of the superconducting wiring layer 22 face each other. Note that the reading unit 210 only needs to be capacitively coupled to the resonator 100, and its shape is not limited to a cross shape.

As described above, the magnetic field application circuit 200 is a circuit that applies a magnetic field to the plurality of SQUIDs 110 formed in the superconducting wiring layer 12. As illustrated in FIG. 4B, the magnetic field application circuit 200 is an electrode (wire) that goes around in a predetermined shape. Specifically, the magnetic field application circuit 200 is an electrode having a partially cutaway annular shape, that is, a C-shape. That is, the magnetic field application circuit 200 is a substantially annular electrode (wire). When a current flows through the magnetic field application circuit 200, a magnetic field passing through the inside of the substantially annular electrode is generated. The magnetic field application circuit 200 (that is, the substantially annular electrode) is arranged at a position corresponding to the position of the SQUID 110 in the superconducting wiring layer 12. That is, as indicated by an arrow M in FIG. 1, the magnetic field application circuit 200 (that is, the substantially annular electrode) is arranged in the superconducting wiring layer 22 such that a magnetic field (arrow M) generated inside the substantially annular electrode penetrates each of the plurality of SQUIDs 110. In other words, the magnetic field application circuit 200 (that is, the substantially annular electrode) is arranged so as to face the at least two SQUIDs 110.

The magnetic field application circuit 200 can be arranged at any position as long as a condition that a magnetic field is applied to at least two SQUIDs 110 of the superconducting wiring layer 12 is satisfied. For example, when viewed in a direction (vertical direction in FIG. 1) in which the surface of the superconducting wiring layer 12 and the surface of the superconducting wiring layer 22 face each other, the substantially annular wire of the magnetic field application circuit 200 may be arranged at a position overlapping the entire or a part of the arrangement region of the series of SQUIDs 110. However, when the conductive member 102A constituting the resonator 100 is affected by the magnetic field by the magnetic field application circuit 200, the resonance frequency fluctuates, and in addition, a Q value (Quality factor) of the resonator 100 is deteriorated. For this reason, the coherence of the quantum bits is deteriorated. Therefore, it is preferable that the magnetic field application circuit 200 (that is, the substantially annular electrode) be arranged away from the conductive member 102A so as not to overlap with the conductive member 102A when viewed from the direction (vertical direction in FIG. 1) in which the surface of the superconducting wiring layer 12 and the surface of the superconducting wiring layer 22 face each other. In other words, the magnetic field application circuit 200 (that is, the substantially annular electrode) is preferably arranged away from the conductive member 102A so as not to overlap with the conductive member 102A when viewed from the direction (vertical direction in FIG. 1) in which the substantially annular electrode and the SQUID 110 face each other. That is, it is preferable that the magnetic field application circuit 200 is arranged in the superconducting wiring layer 22 so that the substantially annular electrode does not cover the conductive member 102A when viewed from the direction (vertical direction in FIG. 1) in which the surface of the superconducting wiring layer 12 and the surface of the superconducting wiring layer 22 face each other. By doing so, deterioration of coherence can be suppressed.

One end of the magnetic field application circuit 200 is connected to a ground electrode. For example, one end of the magnetic field application circuit 200 may be connected to the ground electrode 101 of the superconducting wiring layer 12 via the bumps 15, may be connected to the ground electrode 201, or may be connected to the ground electrode of the superconducting wiring layer 23. The other end of the magnetic field application circuit 200 is connected to a current control unit (not illustrated). The current control unit supplies a direct current for controlling the oscillation frequency and an alternating current for generating oscillation to the magnetic field application circuit 200.

The first example embodiment has been described above. In the present example embodiment, the oscillator 300 includes the resonator 100 including the plurality of SQUIDs 110 and the magnetic field application circuit 200 including an electrode going around in a predetermined shape. The resonator 100 is arranged on the surface (first surface) of the superconducting wiring layer 12, and the electrode of the magnetic field application circuit 200 is arranged on the surface (second surface) of the superconducting wiring layer 22 facing the first surface such that the magnetic field generated inside the electrode passes through each of the plurality of SQUIDs 110. Therefore, it is not necessary to dispose the magnetic field application circuit 200 in the superconducting wiring layer 12 in which the resonator 100 is arranged. Therefore, it is possible to suppress an increase in the occupied area of the circuit in the superconducting wiring layer 12. That is, by three-dimensionally arranging the magnetic field application circuit 200 and the resonator 100, the occupied area of the circuit can be suppressed.

Note that, in the above-described example embodiment, the resonator 100 includes a conductive member having a predetermined shape connected to the SQUID 110, such as the conductive member 102A. According to such a configuration, the impedance and the Q value of the resonator 100 can be made appropriate. In particular, in the above-described example embodiment, the cross-shaped conductive member 102A is used, and the SQUID 110 is connected to a portion protruding outward in the cross shape of the conductive member 102A. According to such a configuration, excellent controllability or expandability can be provided for connection of a quantum bit circuit using the coupler 104.

First Modification

Figure 7A:
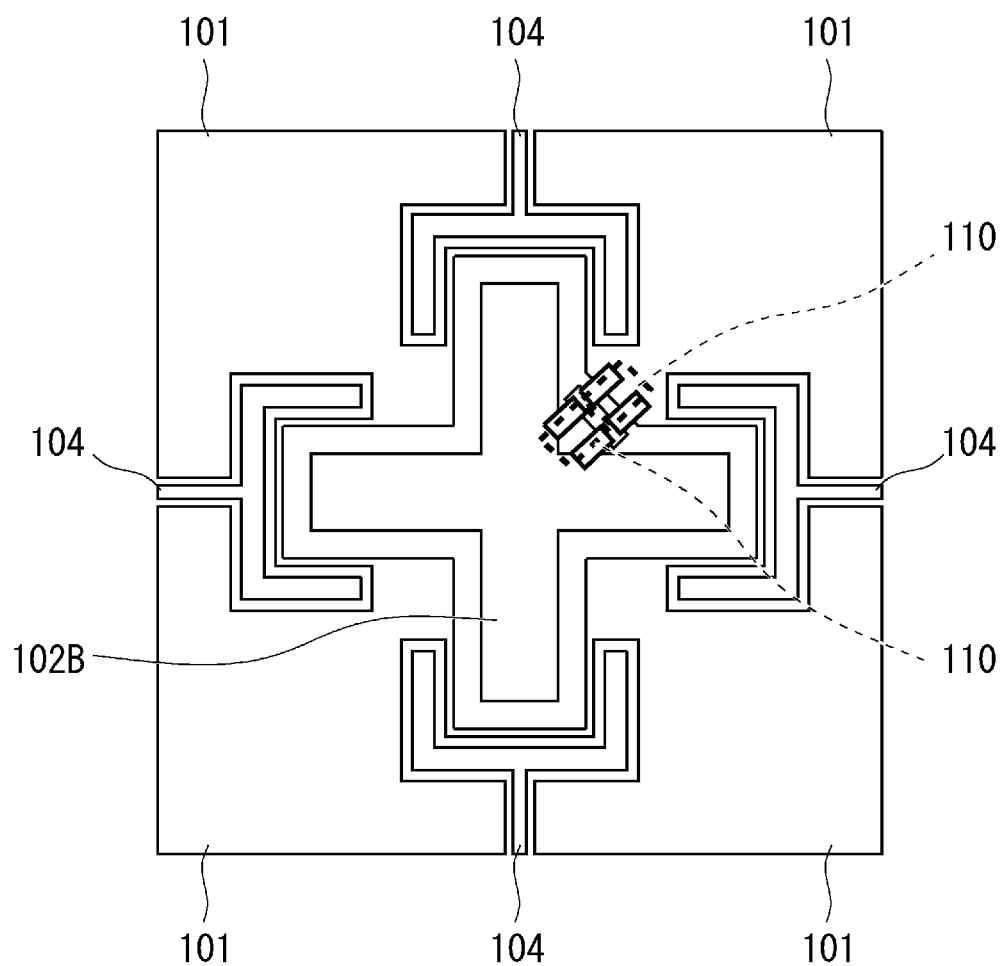
FIG. 7A is a plan view of a superconducting wiring layer on a lower surface of a quantum chip according to a first modification.
Figure 7B:
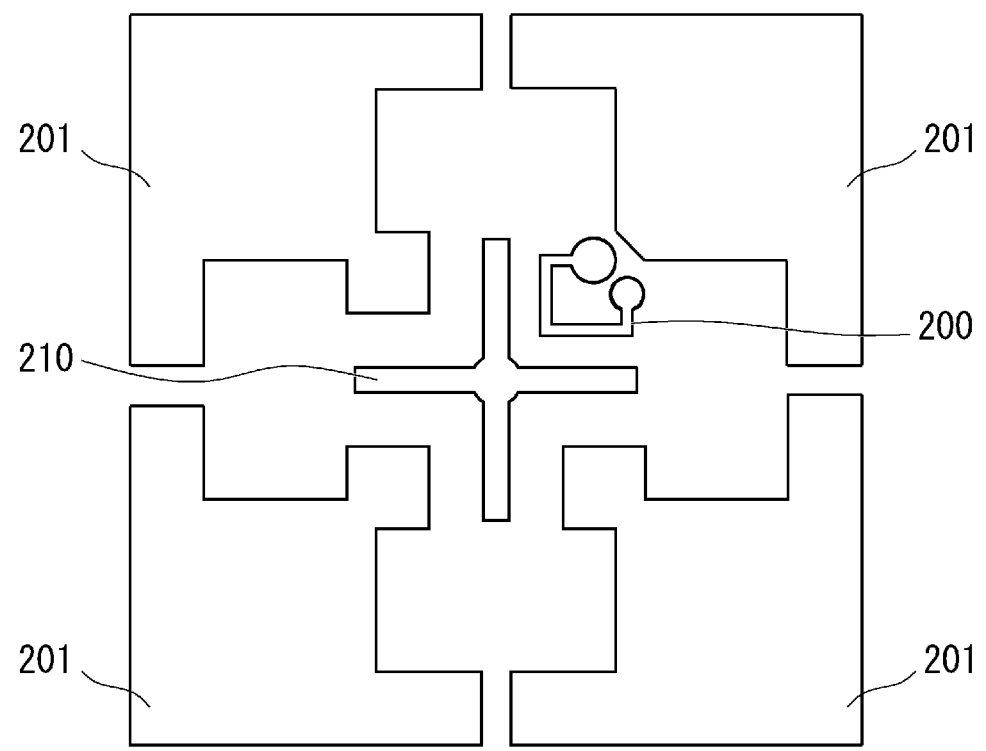
FIG. 7B is a plan view of a superconducting wiring layer on an upper surface of an interposer according to the first modification.

Next, a first modification of the first example embodiment will be described. FIG. 7A is a plan view of the superconducting wiring layer 12 according to the first modification, and FIG. 7B is a plan view of the superconducting wiring layer 22 according to the first modification. As illustrated in FIG. 7A, the first modification different from the above-described example embodiment in that the series of SQUIDs 110 are connected to a constricted portion of a cross-shaped conductive member 102B. Along with this, as illustrated in FIG. 7B, the arrangement position of the magnetic field application circuit 200 in the superconducting wiring layer 22 is different. Hereinafter, the first modification will be described in detail, but the description overlapping with the description in the first example embodiment will be appropriately omitted.

In the present modification, instead of the conductive member 102A illustrated in the first example embodiment, a cross-shaped conductive member 102B that is bilaterally symmetrical and vertically symmetrical is used. Similarly to the first example embodiment, the plurality of SQUIDs 110 is connected in series to the conductive member 102B. That is, the plurality of SQUIDs 110 is arranged so as to bridge between the conductive member 102B and the ground electrode 101 provided around the conductive member 102B. However, as described above, the connection position is different from that of the first example embodiment. Specifically, as illustrated in FIG. 7A, the plurality of SQUIDs 110 is connected in series to one of constricted portions (that is, bases of four arms of the cross-shaped conductive member 102B) that are recessed portions in a cross shape of the conductive member 102B, so as to bridge between the conductive member 102B and the ground electrode 101.

Also in the present modification, as in the first example embodiment, four couplers 104 are arranged on four sides of the conductive member 102B. Specifically, as illustrated in FIG. 7A, the coupler 104 is arranged at each of four end portions (that is, the tips of the four arms of the cross-shaped conductive member 102B), which are portions protruding outward in the cross-shaped conductive member 102B. However, unlike the first example embodiment, in the present modification, the SQUID 110 is not connected to any of the four arms of the conductive member 102A, so that the four couplers 104 can realize symmetrical coupling.

As described above, in the present modification, since the arrangement location of the series of SQUIDs 110 is different, the position of the magnetic field application circuit 200 for applying a magnetic field to the series of SQUIDs 110 is also different from that in the first example embodiment. That is, the magnetic field application circuit 200 is arranged at a position corresponding to the position of the SQUID 110 connected to the constricted portion of the conductive member 102B. Note that, also in the present modification, the magnetic field application circuit 200 can be arranged at any position as long as the condition that the magnetic field is applied to the at least two SQUIDs 110 is satisfied, but is preferably arranged away from the conductive member 102B so as not to overlap with the conductive member 102B.

The first modification has been described above. In the present modification, the SQUID 110 is connected to the constricted portion of the cross shape of the conductive member 102B. According to such a configuration, there are the following advantages as compared with the case where the SQUID 110 is connected to the portion protruding outward in the cross shape of the conductive member 102A. That is, since the coupling between each coupler 104 and the conductive member 102B can be made symmetrical, the design can be facilitated.

In the first example embodiment or the first modification thereof described above, the cross-shaped conductive member is used as the conductive member constituting the resonator 100, but the shape of the conductive member constituting the resonator 100 is not limited thereto. Hereinafter, a configuration using a quadrangular conductive member will be described as a second modification, and a configuration using a round (circular) conductive member will be described as a third modification. However, these are merely examples of the configuration, and the shape of the conductive member constituting the resonator 100 is not limited to a cross shape, a quadrangular shape, and a circle shape, and other shapes may be used.

Second Modification

Figure 8A:
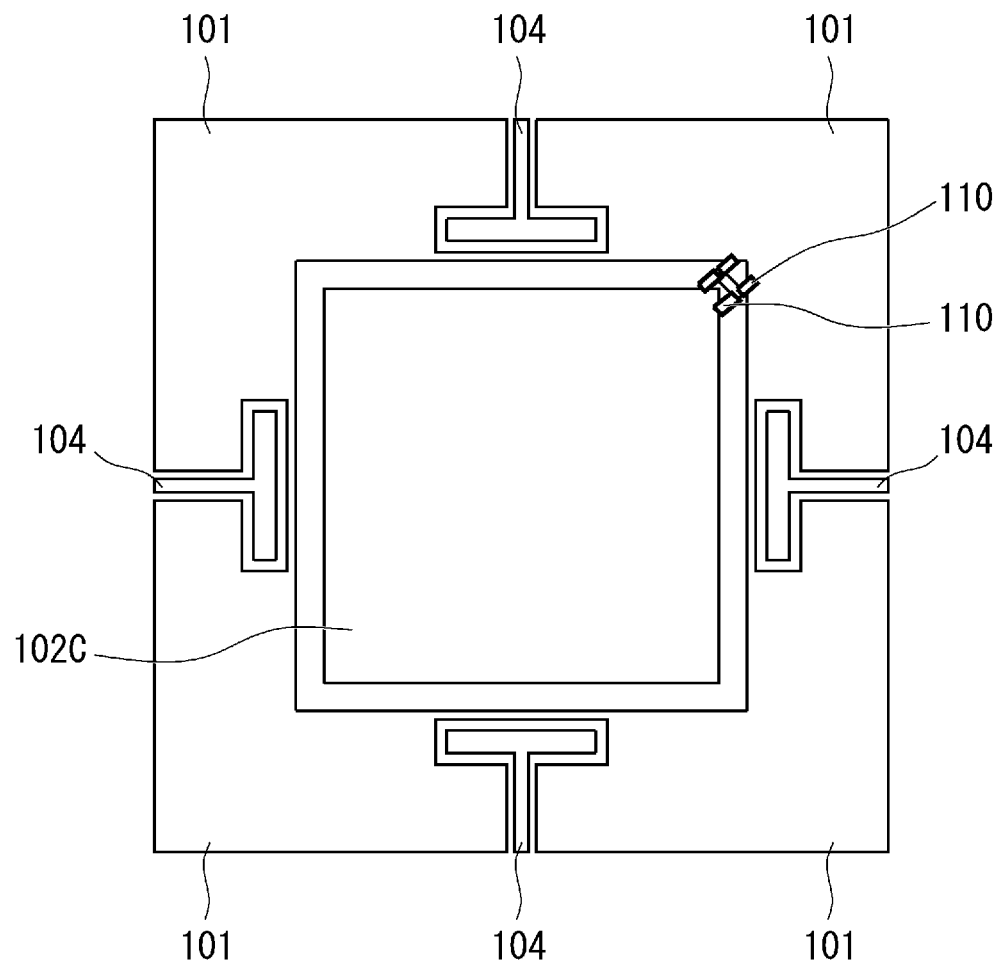
FIG. 8A is a plan view of a superconducting wiring layer on a lower surface of a quantum chip according to a second modification.
Figure 8B:
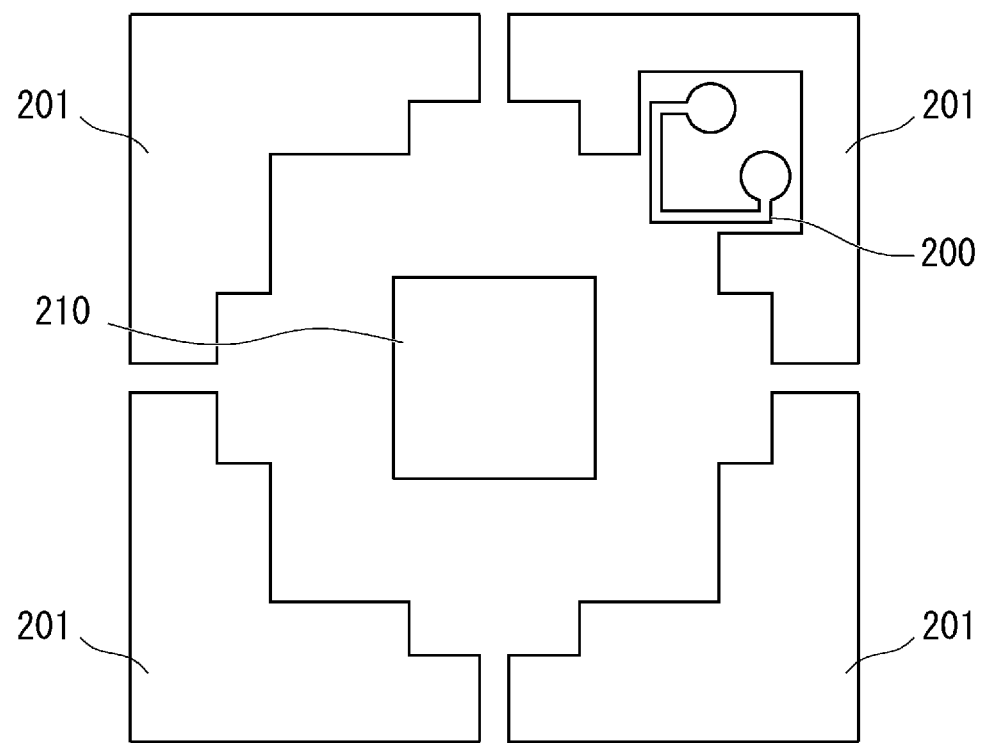
FIG. 8B is a plan view of the superconducting wiring layer on an upper surface of an interposer according to the second modification.

FIG. 8A is a plan view of the superconducting wiring layer 12 according to a second modification, and FIG. 8B is a plan view of the superconducting wiring layer 22 according to the second modification. As illustrated in FIG. 8A, the second modification is different from the first example embodiment in that a quadrangular (for example, square) conductive member 102C is used instead of the cross-shaped conductive member 102A. Hereinafter, the second modification will be described in detail, but the description overlapping with the description in the first example embodiment will be appropriately omitted.

Similarly to the first example embodiment, the plurality of SQUIDs 110 is connected in series to the conductive member 102C. Specifically, as illustrated in FIG. 8A, the plurality of SQUIDs 110 is connected in series to one of the vertex portions of the conductive member 102C so as to bridge between the conductive member 102C and the ground electrode 101 provided around the conductive member 102C. Also in the present modification, similarly to the first example embodiment, four couplers 104 are arranged on four sides of the conductive member 102C. However, in the present modification, as illustrated in FIG. 8A, since the SQUID 110 is connected to the vertex portion of the quadrangle, the coupler 104 is arranged on each side of the quadrangle of the conductive member 102C. Therefore, also in the present modification, the four couplers 104 can realize symmetrical coupling.

As illustrated in FIG. 8B, also in the present modification, in the superconducting wiring layer 22, the ground electrode 201 has a shape in which a region corresponding to the conductive member 102C and the coupler 104 and a region where the magnetic field application circuit 200 is arranged are cut out. Also in the present modification, the reading unit 210 is arranged at a position corresponding to the conductive member 102C. Note that, in the example illustrated in FIG. 8B, the reading unit 210 has a quadrangular shape so as to correspond to the shape of the conductive member 102C. Also in the present modification, in the superconducting wiring layer 22, the magnetic field application circuit 200 is arranged at a position corresponding to the arrangement place of the series of SQUIDs 110 in the superconducting wiring layer 12. That is, the magnetic field application circuit 200 is arranged at a position corresponding to the position of the SQUID 110 connected to the vertex portion of the conductive member 102C. Note that, also in the present modification, the magnetic field application circuit 200 can be arranged at any position as long as the condition that the magnetic field is applied to the at least two SQUIDs 110 is satisfied, but is preferably arranged away from the conductive member 102C so as not to overlap the conductive member 102C.

The second modification has been described above. In the present modification, the quadrangular conductive member 102C is used. Therefore, due to the difference in shape, the Q value can be increased as compared with the case of using the cross-shaped conductive member. However, in the case of using a quadrangular conductive member, inductance is reduced as compared with the case of using a cross-shaped conductive member due to a difference in shape. Therefore, the use of the cross-shaped conductive member can reduce the size of the resonator.

Third Modification

Figure 9A:
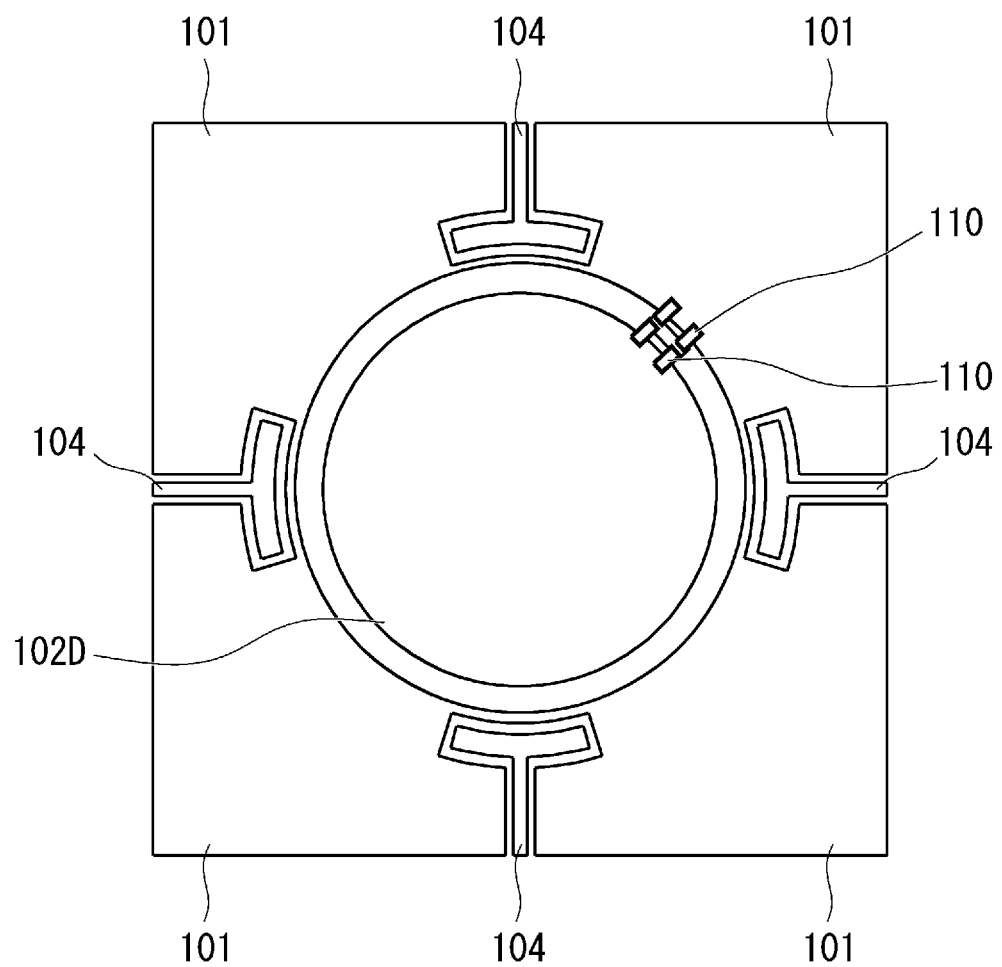
FIG. 9A is a plan view of a superconducting wiring layer on a lower surface of a quantum chip according to a third modification.
Figure 9B:
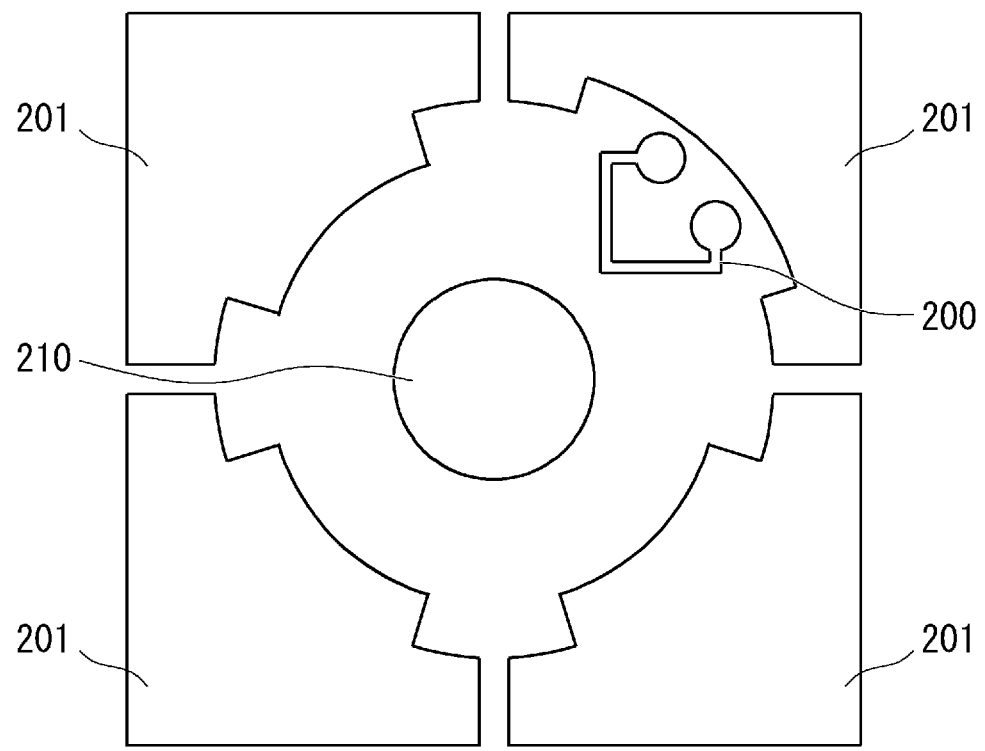
FIG. 9B is a plan view of the superconducting wiring layer on an upper surface of an interposer according to the third modification.

FIG. 9A is a plan view of the superconducting wiring layer 12 according to a third modification, and FIG. 9B is a plan view of the superconducting wiring layer 22 according to the third modification. As illustrated in FIG. 9A, the third modification is different from the above-described first example embodiment in that a round (circular) conductive member 102D is used instead of the cross-shaped conductive member 102A. Hereinafter, the third modification will be described in detail, but the description overlapping with the description in the first example embodiment will be appropriately omitted.

Similarly to the first example embodiment, the plurality of SQUIDs 110 is connected in series to the conductive member 102D. Specifically, as illustrated in FIG. 9A, the plurality of SQUIDs 110 is connected in series at one location on the circumference of the conductive member 102D so as to bridge between the conductive member 102D and the ground electrode 101 provided around the conductive member 102D. Also in the present modification, as in the first example embodiment, four couplers 104 are arranged on four sides of the conductive member 102D. The plurality of SQUIDs 110 is arranged between two adjacent couplers 104 among the four couplers 104 arranged on four sides. Also in the present modification, the four couplers 104 can realize symmetrical coupling.

As illustrated in FIG. 9B, also in the present modification, in the superconducting wiring layer 22, the ground electrode 201 has a shape in which a region corresponding to the conductive member 102D and the coupler 104 and a region where the magnetic field application circuit 200 is arranged are cut out. Also in the present modification, the reading unit 210 is arranged at a position corresponding to the conductive member 102D. In the example illustrated in FIG. 9B, the reading unit 210 has a round (circular) shape so as to correspond to the shape of the conductive member 102D. Also in the present modification, in the superconducting wiring layer 22, the magnetic field application circuit 200 is arranged at a position corresponding to the arrangement place of the series of SQUIDs 110 in the superconducting wiring layer 12. That is, the magnetic field application circuit 200 is arranged at a position corresponding to the position of the SQUID 110 connected on the circumference of the conductive member 102D. Note that, also in the present modification, the magnetic field application circuit 200 can be arranged at any position as long as the condition that the magnetic field is applied to the at least two SQUIDs 110 is satisfied, but is preferably arranged away from the conductive member 102D so as not to overlap the conductive member 102D.

The third modification has been described above. In the present modification, the round conductive member 102D is used. Therefore, due to the difference in shape, the Q value can be increased as compared with the case of using the cross-shaped conductive member. However, in the case of using the round conductive member, the inductance is reduced as compared with the case of using the cross-shaped conductive member due to the difference in shape. Therefore, the use of the cross-shaped conductive member can reduce the size of the resonator.

Second Example Embodiment

Next, a quantum computer using a quantum bit circuit configured by the above-described oscillator 300 will be described. Note that, in the present example embodiment, any configuration among the first example embodiment, the first modification, the second modification, and the third modification described above may be adopted as the configuration of the oscillator 300. Note that the quantum computer here is, for example, a quantum annealing type computer that calculates a solution of an arbitrary problem that can be mapped to the Ising model. As described above, when an alternating current magnetic field having a frequency twice the resonance frequency is applied to the SQUID 110, the oscillator 300 performs parametric oscillation to realize a quantum bit.

Figure 10:
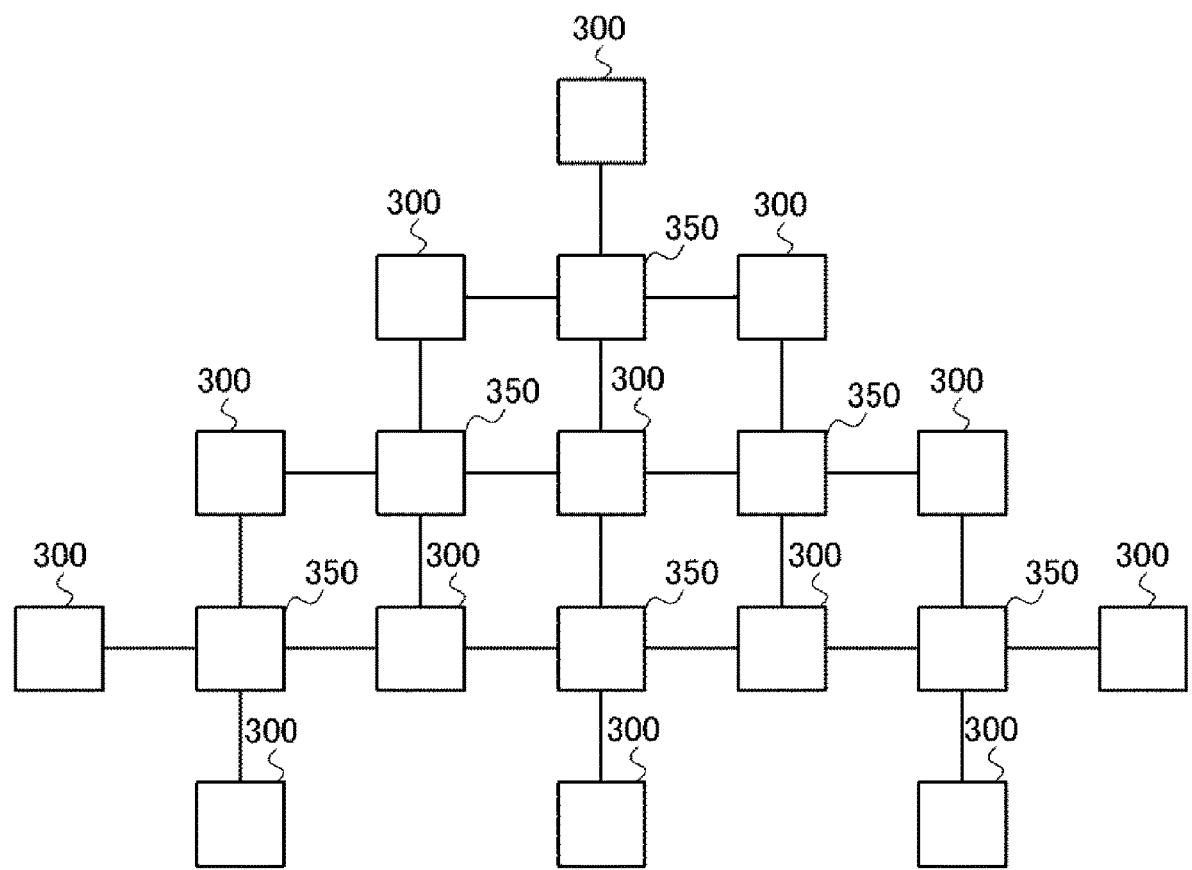
FIG. 10 is a schematic diagram illustrating a configuration of a quantum computer according to second example embodiment.

FIG. 10 is a schematic diagram illustrating a configuration of a quantum computer 30 according to the second example embodiment. The quantum computer 30 includes a plurality of oscillators 300 and coupling circuits 350. The quantum computer 30 is a computer in which the plurality of oscillators 300 (quantum bit circuits) forms a network via the coupling circuits 350. The coupling circuits 350 each are a circuit that couples a predetermined number of the oscillators 300. Specifically, the coupling circuit 350 is a circuit that couples four of the oscillators 300 (quantum bit circuits). In the quantum computer 30 illustrated in FIG. 10, four oscillators 300 are connected by one of the coupling circuits 350. The coupler 104 described above is a terminal of the coupling circuit 350 for coupling with the resonator 100.

In each oscillator 300, a magnetic field is applied to the SQUID 110 by the magnetic field application circuit 200, and parametric oscillation occurs. In addition, as described above, the reading unit 210 is capacitively coupled to each oscillator 300, and the oscillation state of the oscillator 300 is read. As a result, the result of the quantum calculation is read.

In the configuration illustrated in FIG. 10, the quantum computer 30 in which an arbitrary number of oscillators 300 are integrated is realized by arranging and connecting a plurality of unit structures using four of the oscillators 300 and one of the coupling circuits 350 for coupling the oscillators as a unit structure. As illustrated in FIG. 10, each coupling circuits 350 is connected to four of the oscillators 300. Then, each oscillator 300 is connected to one to four of the coupling circuits 350, and the oscillators 300 are arranged so as to be shared by a plurality of unit structures, so that the unit structures are arranged. In the quantum computer 30, at least one of the oscillators 300 is connected to the plurality of coupling circuits 350. In particular, in the example illustrated in FIG. 10, at least one of the oscillators 300 is connected to four of the coupling circuits 350. Furthermore, the quantum computer 30 can also be described as follows. The quantum computer 30 includes the plurality of oscillators 300, and each oscillator 300 is connected to one to four coupling circuits 350. The number of coupling circuits 350 to which each oscillator 300 is connected corresponds to the number of unit structures that share the oscillator 300. As described above, in the example illustrated in FIG. 10, the quantum computer 30 has a plurality of unit structures, and the oscillator 300 is shared by the plurality of unit structures. In the example illustrated in FIG. 10, 13 oscillators 300 are integrated, but any number of oscillators 300 can be integrated by a similar method.

According to the present example embodiment, the quantum computer 30 can be configured by the oscillator 300 in which the magnetic field application circuit 200 and the resonator 100 are three-dimensionally arranged. Therefore, it is possible to realize a quantum computer in which the occupied area of the circuit is suppressed.

Although the invention of the present application has been described above with reference to the example embodiments, the invention of the present application is not limited to the above. Various modifications that can be understood by those skilled in the art can be made to the configuration and details of the present invention within the scope of the invention.

Some or all of the above example embodiments may be described as the following supplementary notes, but are not limited to the following.

(Supplementary Note 1)

An oscillator including:
a resonator including a plurality of loop circuits in which a first superconducting line, a first Josephson junction, a second superconducting line, and a second Josephson junction are annularly connected, the resonator applying a magnetic field to the loop circuit; and
a magnetic field application circuit including an electrode that goes around in a predetermined shape,
wherein the electrode is arranged to face at least two of the loop circuits.

(Supplementary Note 2)

The oscillator according to Supplementary Note 1, wherein
the resonator is arranged on a first surface, and
the electrode is arranged on a second surface facing the first surface.

(Supplementary Note 3)

The oscillator according to Supplementary Note 1 or 2, wherein the resonator includes a conductive member having a predetermined shape and connected to the loop circuit.

(Supplementary Note 4)

The oscillator according to Supplementary Note 3, wherein the electrode is arranged away from the conductive member so as not to overlap the conductive member when viewed from a direction in which the electrode and the loop circuit face each other.

(Supplementary Note 5)

The oscillator according to Supplementary Note 3 or 4, wherein the conductive member has a cross shape.

(Supplementary Note 6)

The oscillator according to Supplementary Note 5, wherein the loop circuit is connected to one of end portions that are portions protruding outward in the cross shape.

(Supplementary Note 7)

The oscillator according to Supplementary Note 5, wherein the loop circuit is connected to one of constricted portions that are recessed portions in the cross shape.

(Supplementary Note 8)

The oscillator according to Supplementary Note 3 or 4, wherein the conductive member has a quadrangular shape.

(Supplementary Note 9)

The oscillator according to Supplementary Note 8, wherein the loop circuit is connected to one of vertex portions of the quadrangle.

(Supplementary Note 10)

The oscillator according to Supplementary Note 3 or 4, wherein the conductive member has a round shape.

(Supplementary Note 11)

A quantum computer having, as a unit structure, a predetermined number of oscillators according to any one of Supplementary Notes 1 to 10 and a coupling circuit that couples the predetermined number of oscillators.

(Supplementary Note 12)

The quantum computer according to Supplementary Note 11, wherein
a plurality of the unit structures is provided, and
the oscillator is shared by the plurality of unit structures.

REFERENCE SIGNS LIST

1 QUANTUM DEVICE
10 QUANTUM CHIP
11, 21 SUBSTRATE
12, 22, 23 SUPERCONDUCTING WIRING LAYER
15 BUMP
20 INTERPOSER
24 VIA
30 QUANTUM COMPUTER
100 RESONATOR
101, 201 GROUND ELECTRODE
102A, 102B, 102C, 102D CONDUCTIVE MEMBER
103 INTERMEDIATE WIRE
104 COUPLER
110 SQUID
111$a$, 111$b$ JOSEPHSON JUNCTION
112$a$, 112$b$ SUPERCONDUCTING LINE
200 MAGNETIC FIELD APPLICATION CIRCUIT
210 READING UNIT
300 OSCILLATOR
350 COUPLING CIRCUIT

What is claimed is:

1. An oscillator comprising:
a resonator including a plurality of loop circuits, each of the plurality of loop circuits comprising:
a first superconducting line;
a first Josephson junction;
a second superconducting line; and
a second Josephson junction,
wherein the first superconducting line, the first Josephson junction, the second superconducting line, and the second Josephson junction are annularly connected; and
a magnetic field application circuit including an electrode that goes around in a predetermined shape, the magnetic field application circuit being configured to apply a magnetic field to the plurality of loop circuits,
wherein the electrode is arranged to face at least two of the plurality of loop circuits,
wherein the resonator includes a conductive member having a cross shape and which is connected to one end of a series of the plurality of loop circuits, and
wherein the one end of the series of the plurality of loop circuits is connected to one of constricted portions of the conductive member, the constricted portions being recessed portions in the cross shape.

2. The oscillator according to claim 1, wherein the resonator is arranged on a surface of a first substrate, and
wherein the electrode is arranged on a surface of a second substrate facing the surface of the first substrate.

3. The oscillator according to claim 1, wherein the electrode is arranged away from the conductive member so as not to overlap the conductive member when viewed from a direction in which the electrode and the plurality of loop circuits face each other.

4. An oscillator comprising:
a resonator including a plurality of loop circuits, each of the plurality of loop circuits comprising:
a first superconducting line;
a first Josephson junction;
a second superconducting line; and
a second Josephson junction,
wherein the first superconducting line, the first Josephson junction, the second superconducting line, and the second Josephson junction are annularly connected in each of the plurality of loop circuits; and
a magnetic field application circuit including an electrode that goes around in a predetermined shape, the magnetic field application circuit being configured to apply a magnetic field to the plurality of loop circuits, wherein the electrode is arranged to face at least two of the plurality of loop circuits, and wherein the resonator includes a conductive member having a quadrangular shape and which is connected to one end of a series of the plurality of loop circuits.

5. The oscillator according to claim 4, wherein the one end of the series of the plurality of loop circuits is connected to one of vertex portions of the quadrangle.

6. An oscillator comprising:
a resonator including a plurality of loop circuits, each of the plurality of loop circuits comprising:
a first superconducting line;
a first Josephson junction;
a second superconducting line; and
a second Josephson junction,
wherein the first superconducting line, the first Josephson junction, the second superconducting line, and the second Josephson junction are annularly connected in each of the plurality of loop circuits; and
a magnetic field application circuit including an electrode that goes around in a predetermined shape, the magnetic field application circuit being configured to apply a magnetic field to the plurality of loop circuits,
wherein the electrode is arranged to face at least two of the plurality of loop circuits, and
wherein the resonator includes a conductive member having a round shape and which is connected to one end of a series of the plurality of loop circuits.

* * * * *